March 4, 1952

E. L. ARNESON 2,587,953

BOTTLE LOADER

Filed Oct. 25, 1947

INVENTOR.
Edwin L. Arneson,
BY
Cromwell, Greist + Warden
Attys.

March 4, 1952     E. L. ARNESON     2,587,953
BOTTLE LOADER
Filed Oct. 25, 1947     5 Sheets-Sheet 2
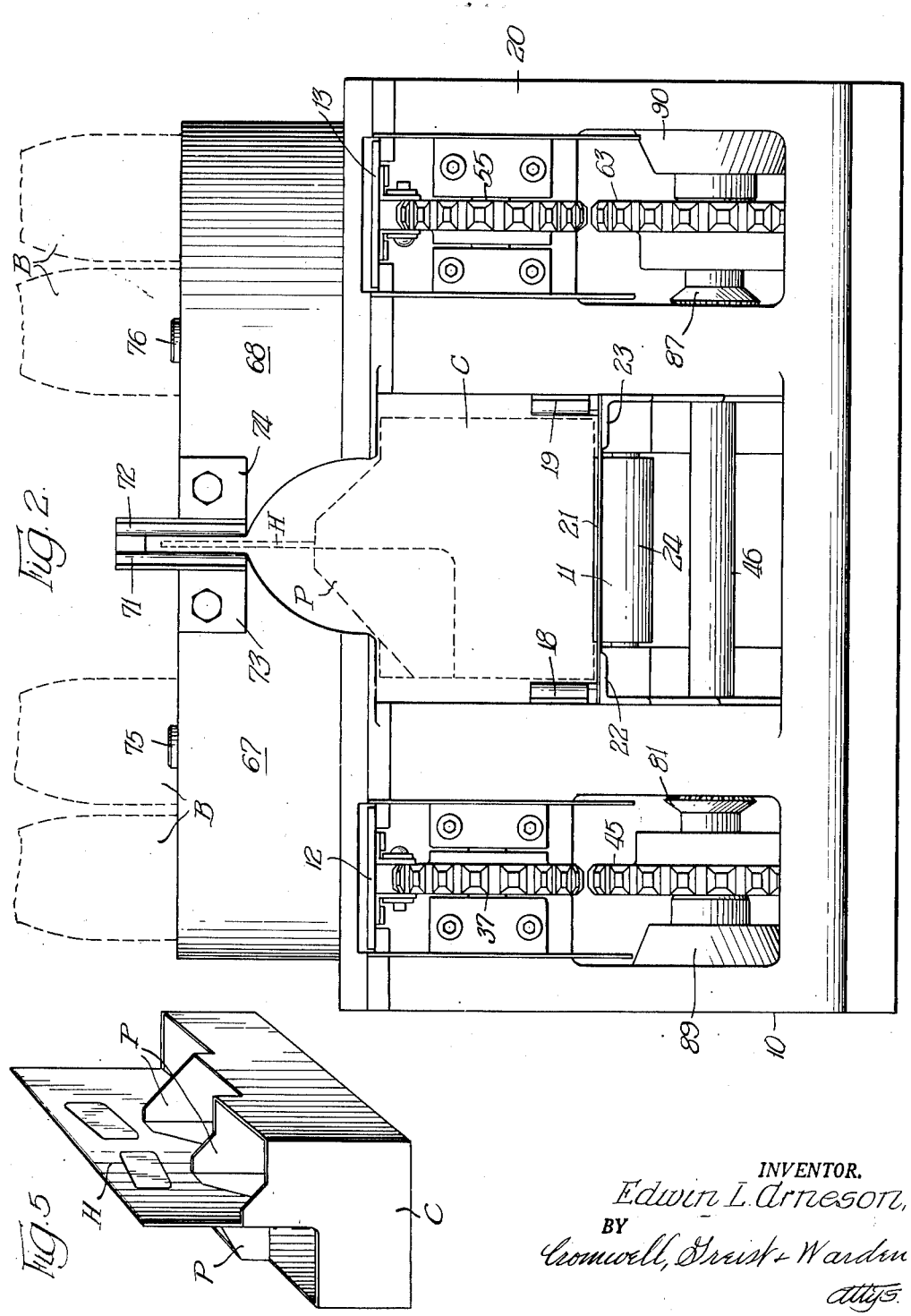
INVENTOR.
Edwin L. Arneson,
BY
Cromwell, Greist & Warden
Attys.

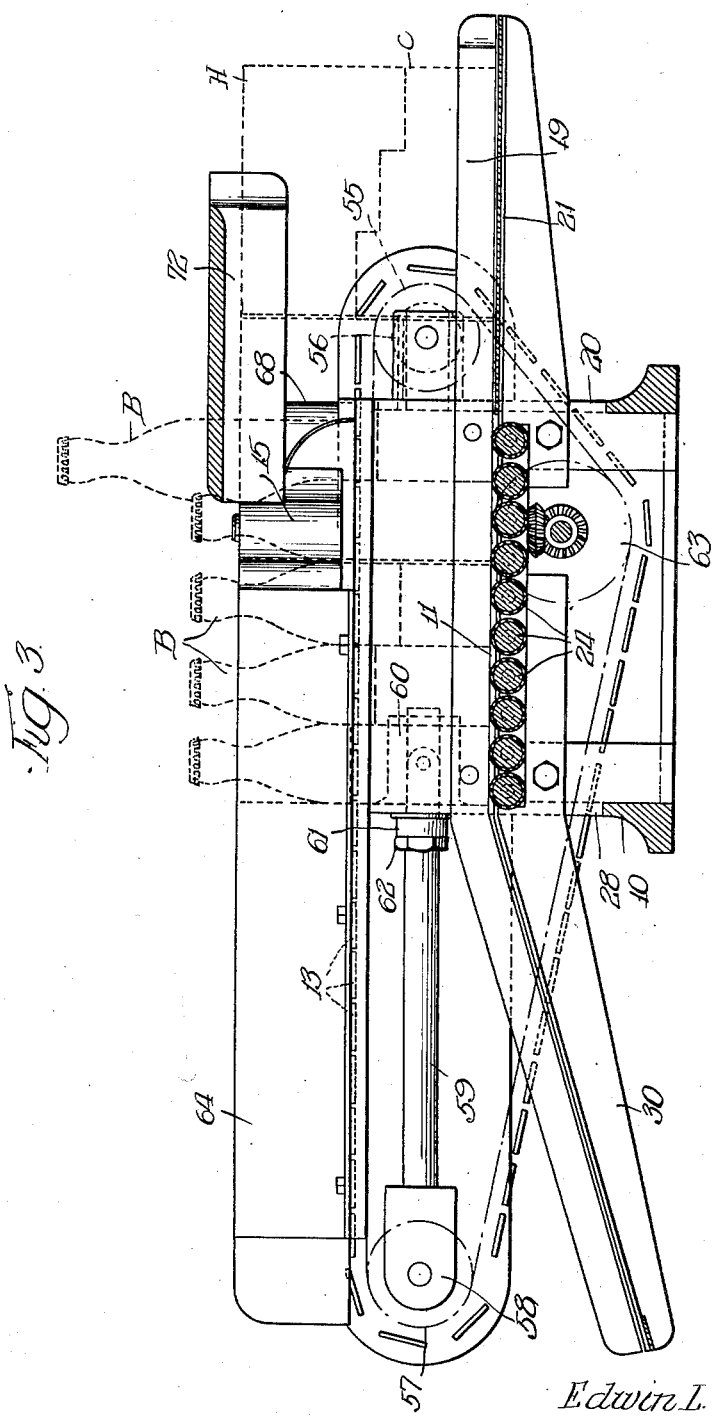

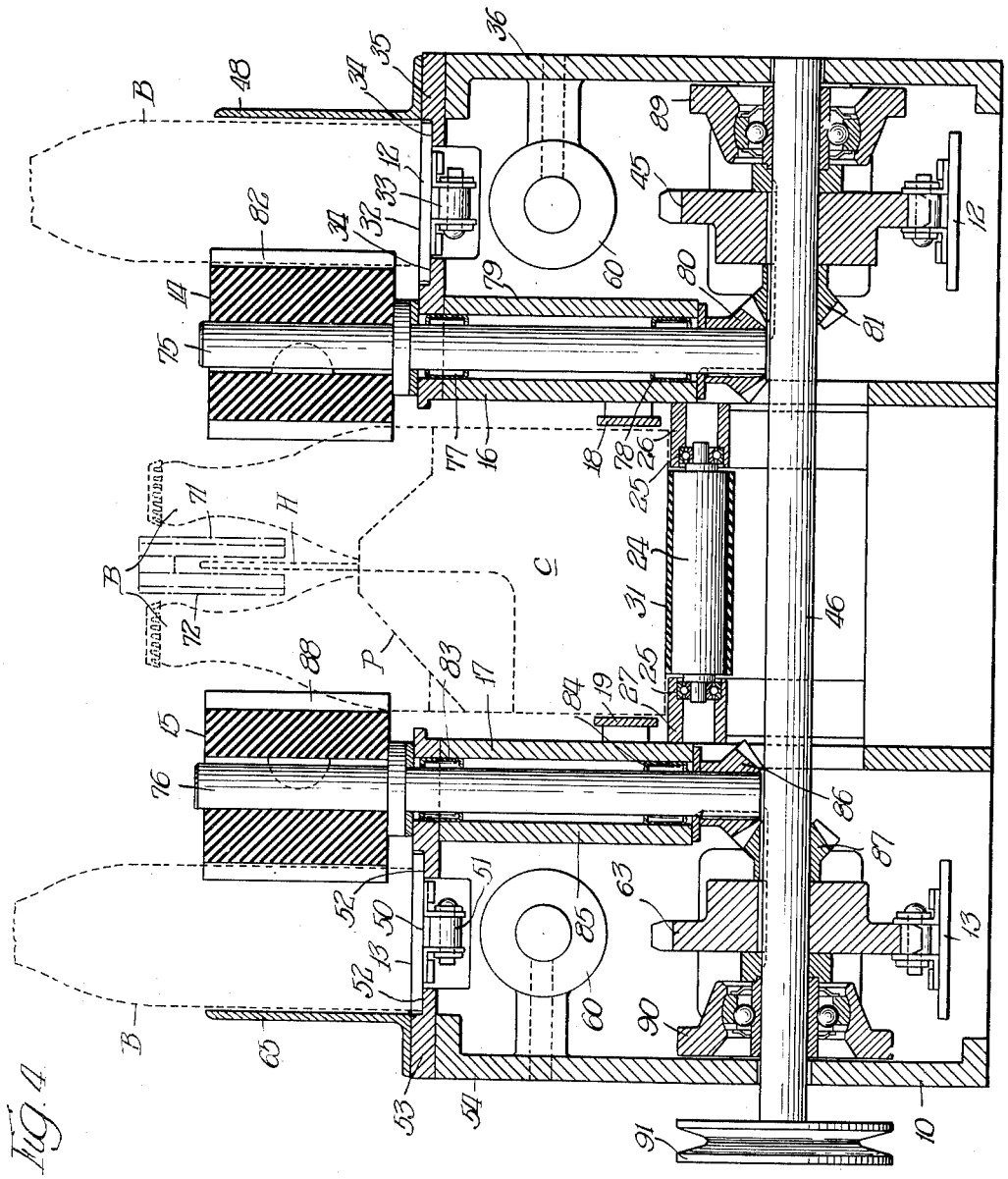

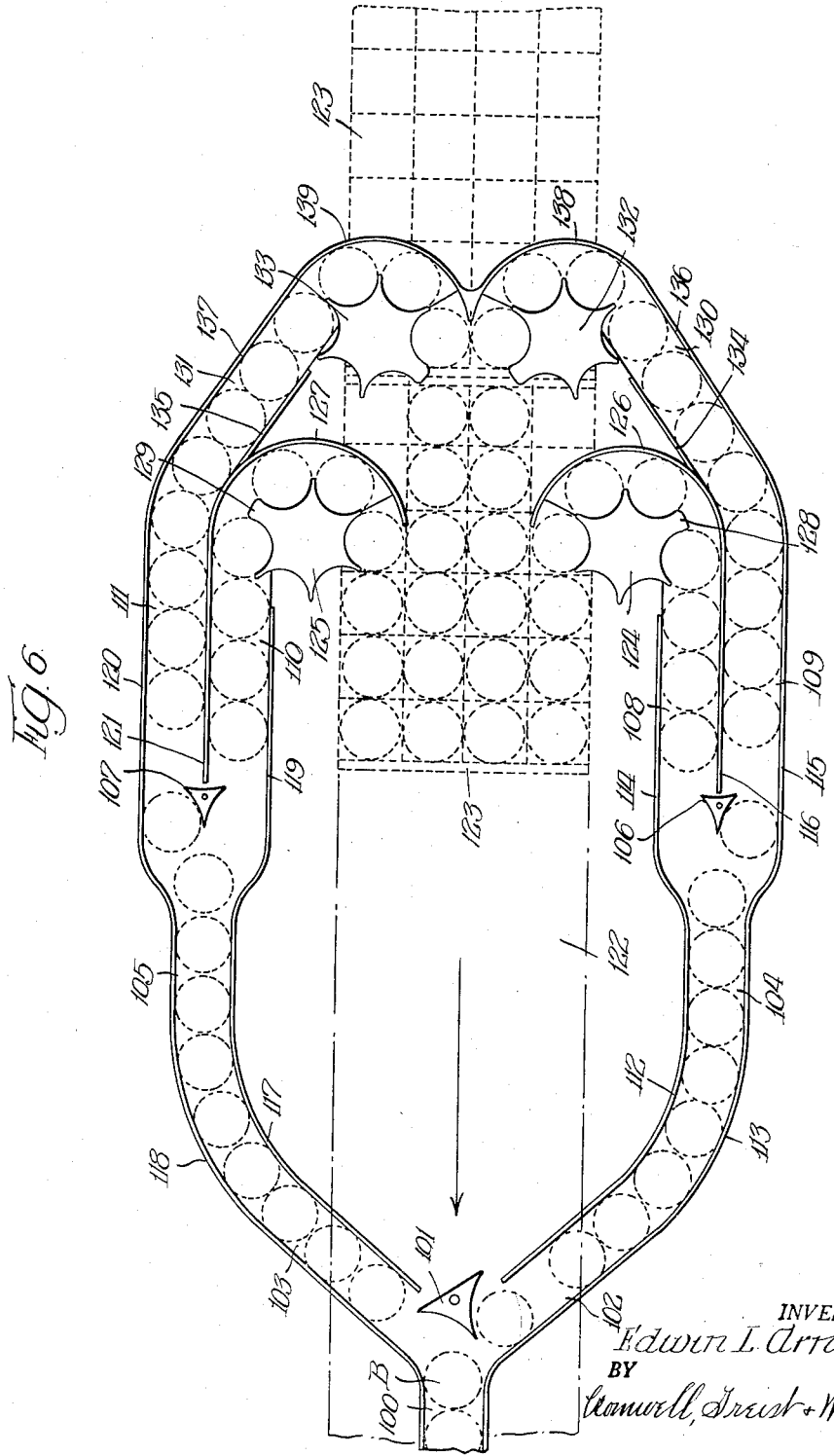

Patented Mar. 4, 1952

2,587,953

UNITED STATES PATENT OFFICE 2,587,953

BOTTLE LOADER

Edwin L. Arneson, Morris, Ill., assignor to Morris Paper Mills, Chicago, Ill., a corporation of Illinois Application October 25, 1947, Serial No. 782,164

14 Claims. (Cl. 226—14)

This invention is concerned with improvements in machines for loading cartons and cases with bottles.

The general object of the invention is to provide a machine having mechanism for conveying bottles to opposite sides of a loading station and delivering the bottles in proper sequence into cellular cartons or cases as they are moved past the station.

A more specific object of the invention is to provide a machine for filling cellular type containers with rows of bottles which machine comprises mechanism to deliver the bottles in spaced parallel lines on opposite sides of a loading station and mechanism to move the bottles in sequence to a loading position immediately above a container at the loading station where the bottles are freed to drop by gravity into the cells of the container.

A further object of the invention is to provide a bottle loading machine which comprises a central guideway for guiding a cellular type container past a loading station, a pair of conveyors for conveying bottles to opposite sides of the loading station and mechanism associated with the conveyors for delivering successive pairs of the bottles into a loading position above the carton guideway where the bottles are freed to drop by gravity into oppositely disposed pairs of cells in the container.

Another object of the iivention is to provide in a machine of the type described a pair of horizontally spaced star wheels for delivering simultaneously into loading position above a cellular container successive pairs of bottles for gravity feed into oppositely positioned aligned cells in the container.

These and other objects of the invention will be understood by those skilled in the art from a description of the preferred forms of the loading machine which are shown by way of illustration in the accompanying drawings, wherein:

Fig. 2 is an end elevation of the bottle loading machine;

Fig. 3 is a longitudinal section, taken on the line 3—3 of Fig. 1;

Fig. 4 is a transverse section taken on the line 4—4 of Fig. 1;

Fig. 5 is a perspective view of a carton which is adapted to be loaded with bottles in the machine shown in Fig. 1; and Fig. 6 is a schematic plan view of a modified form of the machine.

Figure 1:
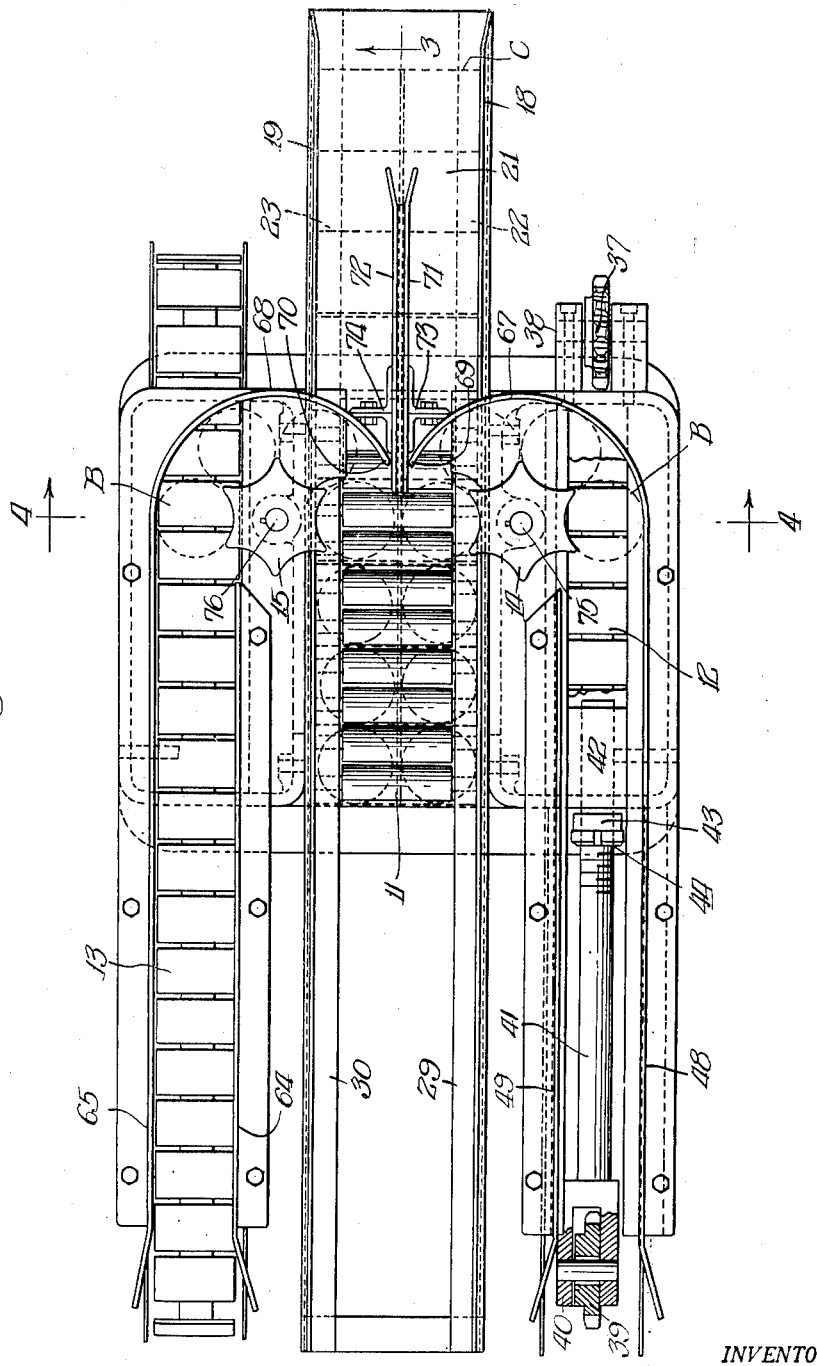
Fig. 1 is a plan view, with parts broken away, of a bottle loading machine which incorporates the principles of the invention.

The invention is illustrated in the bottle loading machine shown in Figs. 1 to 4 of the drawings, which machine is adapted to load or fill a cellular container of the general type C shown in Fig. 5 with a half-dozen beverage bottles B.

The illustrated machine comprises a frame 10 which supports a central guideway 11 along which the containers C are adapted to be moved and parallel endless conveyors 12 and 13 which are adapted to deliver the bottles B to opposite sides of the guideway 11. The frame 10 also supports a pair of star wheels 14 and 15 which cooperate with the conveyors 12 and 13 to successively move into loading position above the guideway 11 the bottles B required to fill the aligned cells of the containers C as the latter are moved along the guideway 11, successive pairs of the bottles B being simultaneously moved into the loading position and allowed to drop by gravity into the containers C beneath the same.

The machine frame or base 10 includes a pair of laterally spaced inner vertical frame members 16 and 17 which support at an intermediate horizontal level side guide plates or rails 18 and 19. The side guide plates 18 and 19 are separated a sufficient distance to accommodate the width of the particular bottle container C which the machine is adapted to fill. The side guide plates 18 and 19 extent a substantial distance rearwardly of the rear end plate 20 of the base 10. A container bottom support plate 21 extends horizontally between the rearwardly extending portions of the side guide plates 18 and 19 and is supported by rails 22 and 23 which are secured beneath the side guide plates 18 and 19 to the frame plates 16 and 17, respectively.

A series of rollers 24 are positioned forwardly of the bottom plate 21. The rollers 24 are supported by bearings 25 which are mounted in blocks 26, 27 and provide a platform on the same level with the top surface of the bottom support plate 21 which extends the length of the base 10 approximately from the rear frame wall 20 to the forward frame wall 28. The side guide plates 18 and 19 have forwardly extending portions which are inclined downwardly and bottom support rails 29 and 30 are provided along the bottom edge of these forward portions to form therewith a downwardly inclined discharge section for the container guideway. The containers C are fed into the machine at the rear end of the guideway 11 and move into loading position on the platform formed by the rollers 24. The rollers 24 are provided with rubber surfaces 31 for cushioning the bottles B as they are dropped by gravity into the container C supported thereon.

The conveyors 12 and 13 are mounted on opposite sides of the central guideway 11 and are driven in synchronism by a common source of power. The conveyor 12 comprises a series of platforms 32 each of which is pivotally secured to a link of an endless chain 33. The upper run of conveyor 12 is received in paralle guideway forming recesses 34 formed in the top plate 35 which is supported on and extends between the inner frame wall 16 and the outer frame wall 36 of the base 10. The one end of the chain 33 is carried by a fixed idler 37 which is journaled in a bracket 38 mounted on the rear frame wall 20 of the base 10. The other end of the conveyor chain 33 is carried by an idler 39 which is journaled in bracket 40. The bracket 40 is carried on the end of an arm 41 which is adjustably secured at the other end in a block 42. The block 42 is mounted on the frame 10 at the forward wall 28. A threaded take-up spacer 43 is provided on the arm 41 and is locked in position by a lock nut 44 for adjusting the idler 39 in a horizontal direction. The conveyor chain 33 is driven by a sprocket 45 which is keyed to a power shaft 46 extending transversely of the base 10. Spaced side guide members 48 and 49 extend upwardly from the top plate 35 and cooperate with the conveyor 12 to deliver a line of bottles B in abutting relation to the star wheel 14 at one side of the loading station.

The conveyor 13 is similar to conveyor 12 and comprises a series of platform members 50 mounted on a chain 51. The upper run of conveyor 12 is received in a guideway formed by recesses 52 provided in the plate 53 which is supported on the inner and outer side frame plates 17 and 54 of the base 10. The chain 51 is carried at the rear end by an idler 55 which is journaled in a bracket 56 attached to the rear plate 20 of the base 10. The chain 51 is carried at its forward end by an idler 57 journaled in the bracket 58 which is carried on the end of a sprocket take-up arm 59. The other end of the arm 59 is adjustably secured in a bracket 60 attached to the frame 10 by means of a threaded take-up spacer 61 and a lock nut 62. The chain 51 is driven by a sprocket 63 which is keyed to the power shaft 46. Side guide plates 64 and 65 extend upwardly along the upper run of the conveyor 13 and confine the bottles B carried on the same to a single line. The bottles B are delivered in abutting relation to the star wheel 15 at the side of the loading station opposite the star wheel 14.

The inner side guide plates 49 and 64 which cooperate with the bottle delivery conveyors 12 and 13 extend to approximately the center of the machine. The outer side guide plates 48 and 65 extend to approximately the rear side 20 of the machine and include inwardly curved sections 67 and 68 providing approximately a return bend, terminating in slightly spaced relation, along the longitudinal center line of the container guideway 11 at their inner ends 69 and 70.

A pair of vertically positioned and spaced container guide plates 71 and 72 are supported by brackets 73 and 74 which are attached to the curved sections 67 and 68 adjacent their ends 69 and 70. The plates 71 and 72 extend rearwardly a sufficient distance to receive and guide the upwardly extending center wall or handle forming partition H of the container C.

The star wheels 14 and 15, which are positioned at the inner sides of the conveyors 12 and 13 and opposite the loading station, are keyed to the upper ends of vertical shafts 75 and 76. The shaft 75 is mounted in bearings 77 and 78 secured in opposite ends of a vertically positioned bracket 79 which is supported on the outer face of the wall 16 of the base 10. The lower end of the shaft 75 is provided with a miter gear 80 which is driven by a miter gear 81 on the power shaft 46.

The star wheel 14 is provided with spaced, concave, vertical recesses 82 on its outer periphery which are curved to correspond to the curved surface of the particular bottles B which the machine is adapted to handle. The shaft 75 is located along the side of the conveyor 12 so that the star wheel 14 projects over the upper run of the conveyor 12 to receive the bottles B in the recesses 82. The shaft 75 is spaced a sufficient distance from the curved section 67 of the outer side guide plate to accommodate the diameter of the bottles B, so that the bottles B will be retained in the grooves or recesses 82 of the star wheel and moved along the curved section 67 to the loading position forwardly of the ends 69 and 70 by rotation of the star wheel.

The star wheel 15 is keyed to the upper end of the shaft 76 which is supported in bearings 83 and 84 mounted in a bracket 85 attached to the frame adjacent the inner wall 17. The lower end of the shaft 76 is provided with a miter gear 86 which is driven by the miter gear 87 on the power shaft 46. The star wheel 15 is provided with spaced, concave, vertical grooves 88 on its outer periphery which correspond to the curvature of the bottles B. The shaft 76 is located directly opposite the shaft 75 and is positioned so that there is sufficient clearance between the star wheel 15 and the curved section 68 of the outer guide plate to accommodate the diameter of the bottles B. The bottles B are delivered by conveyor 13 to the grooves 88 of the star wheel 15 and moved to loading position by rotation of the star wheel.

The power shaft 46 is journaled in bearings 89 and 90 which are supported in aligned relation on the outer frame plates 36 and 54 of the base 10. One end of the shaft 46 may be extended to receive a pulley 91 for connection to a source of power.

The illustrated machine is particularly adapted to load cellular containers, such as the step-up type carton C, shown in Fig. 5. The carton C is provided with two parallel rows of cells or pockets for receiving the bottles B which are separated by a central vertical handle forming partition H. The carton C is adapted to be loaded with a half dozen bottles B of the type used in marketing soft drinks, beer and similar beverages. It is understood, of course, that other containers of similar size and shape are adapted to be filled by the machine and that it is not intended to limit the use of machine to the filling of the particular container illustrated nor to the handling of bottle beverages only.

The cartons C are positioned by hand on the bottom supporting plate 21 and moved onto the platform formed by rollers 24 with the central partition H extending upwardly between the side plates 71 and 72. The cartons C are moved relative to the movement of the star wheels 14 and 15 so that pairs of oppositely disposed carton cells are positioned in vertical alignment with pairs of bottles B as the latter are moved by the star wheels past the ends 69 and 70 of the outside guide plates 48 and 65 to a point where the bottoms of the bottles B are clear of the top plates 35 and 53 whereupon the bottles B are free to drop into the cells of the carton C. As each successive pair of bottles B are moved into delivery position by the star wheels 14 and 15 and dropped into the cells of the carton C the carton C is moved forwardly to present in proper aligned relation the next pair of cells to receive the succeeding pair of bottles B delivered by the star wheels 14 and 15. The vertical bottle pockets or recesses 82 and 88 on the star wheels 14 and 15 are slightly spaced to accommodate the thickness of the transverse partitions P separating the cells in the carton C.

While the illustrated form of the machine is adapted for hand feeding of the cartons or containers C, it will be obvious that a conveyor of any conventional type may be substituted for the supporting plate 21 and its movement correlated with the movement of the star wheels 14 and 15 to move the containers into the proper position for receiving the bottles as they are delivered over the same by the star wheels 14 and 15. Any conventional control means may be employed to insure a continuous supply of bottles and containers and to prevent the incomplete filling of any of the cells of any of the containers. Automatic stop mechanism may be provided for controlling the operation of the star wheels 14 and 15 and the delivery of the containers into proper loading position.

In Fig. 6 a modified form of the machine is schematically shown which is adapted to load or fill a conventional twenty-four bottle case. In this form of the invention the bottles B are delivered in a single line by a conveyor 100 to a diverter or separator member 101 which directs alternate bottles onto two diverging single line conveyors 102 and 103. The conveyors 102 and 103 extend to two parallel spaced single line conveyors 104 and 105. The bottles B are delivered from the conveyors 104 and 105 to separator members 106 and 107, respectively.

The separator member 106 delivers the bottles alternately to parallel inner and outer single line conveyors 108 and 109, respectively. The separator member 107 delivers the bottles alternately to parallel inner and outer single line conveyors 110 and 111, respectively.

Inner and outer side guide rails 112 and 113 cooperate with the conveyors 102 and 104 to retain the bottles in a single line on the conveyors. The inner guide rail 112 merges with a side guide rail section 114 which extends along the inside of conveyor 108. The outer guide rail 113 merges with a side guide rail section 115 which extends along the outside of the conveyor 109. An intermediate guide rail section 116 separates the lines of bottles on the conveyors 108 and 109.

Inner and outer side guide rails 117 and 118 cooperate with the conveyors 103 and 105 to retain the bottles in a single line on the conveyors. The inner guide rail 117 merges with a side guide rail section 119 which extends along the inside of conveyor 110. The outer guide rail 118 merges with a side guide rail section 120 which extends along the outside of conveyor 111. An intermediate guide rail section 121 separates the lines of bottles on the conveyors 110 and 111.

The conveyors 108 and 110 are laterally spaced and extend along opposite sides of a central guideway 122 upon which cellular cases 123 are delivered in a direction opposite to the movement of the bottles B and at a lower level. Conveyors 108 and 110 deliver the bottles to star wheels 124 and 125, respectively. The star wheels 124 and 125 are identical. They are mounted on laterally spaced vertical shafts and have six vertical grooves or pockets on their surface for receiving the bottles, one by one, from the conveyors 108 and 110 and moving them through approximately 180 degrees to a loading position immediately above the outside lines of cells in the case 123, where the bottles are free to drop into oppositely disposed aligned cells. The inner side guide rails 114 and 119 terminate short of the star wheels 124 and 125, respectively, while the intermediate guide rails 116 and 121 merge into inwardly curved end guide sections 126 and 127 which cooperate with the star wheels 124 and 125 to retain the bottles in the pockets in the star wheels until the bottles are moved by the star wheels to the proper loading position over the case 123. The vertical bottle receiving recesses in the star wheels 124 and 125 are separated by spaces corresponding in width to the thickness of the partitions separating the cells in the case 123 and one wider space 128 and 129, respectively, is provided on each wheel to accommodate the thickness of the end walls where the cases are in abutting relation as they follow each other in the guideway 122.

The outer conveyors 109 and 111 extend to inwardly directed conveyors 130 and 131. Star wheels 132 and 133 are arranged on laterally spaced vertical shafts adjacent the ends of the conveyors 130 and 131, respectively, for moving the bottles from the conveyors 130 and 131 to loading position over the inside rows of cells in the case 123. Inner side guide sections 134 and 135 extend from the curved guide sections 126 and 127 to the star wheels 132 and 133 along the inside of conveyors 130 and 131. Outer side guide sections 136 and 137 form extensions of the side guide rails 109 and 120 and terminate in inwardly curved end guide sections 138 and 139 which cooperate with the star wheels 132 and 133 to retain the bottles in the vertical pockets in the star wheels. The star wheels 132 and 133 are identical in construction with the star wheels 124 and 125.

In this form of the machine the cases 123 are moved into loading position so that successive transverse rows of cells are presented beneath the respective pairs of star wheels 124, 125 and 132, 133 to receive the bottles as they are delivered into loading position above the case guideway 122. The conveyors 100, 102, 103, 104, 108, 109, 110 and 111, are operated in such a manner as to provide a continuous supply of bottles for the star wheels.

I claim:

1. In a bottle loading machine, a central guideway for receiving cellular bottle containers, a pair of conveyors on opposite sides of said guideway for delivering bottles to a position adjacent said guideway, and mechanism on opposite sides of said guideway for moving the bottles in pairs from said conveyors to a loading position over said guideway above a container positioned thereon where the bottles are free to drop by gravity into aligned cells in the container.

2. A bottle loading mechanism comprising a base, a carton supporting platform positioned centrally of the base, a pair of oppositely disposed bottle conveyors supported on said base and having their upper runs positioned on opposite sides of and above said platform, a pair of star wheels supported in oppositely disposed relation adjacent said conveyors for moving bottles from said upper runs, and means for guiding the bottles as they are moved from the conveyor runs by the star wheels to a position over the platform where they are free to drop into a container positioned thereon.

3. In a bottle loading machine, a base, a central guideway for receiving a cellular carton supported on said base, a pair of bottle delivery conveyors supported on said base in parallel spaced relation on opposite sides of said central guideway, said conveyors being arranged in vertical spaced relation relative to said central guideway and having delivery ends terminating adjacent a loading station on said central guideway, a star wheel arranged between said central guideway and each of said bottle delivery conveyors, and means cooperating with said star wheel whereby successive pairs of bottles are moved from the conveyors and guided to a loading position over the central guideway for gravity delivery into a container positioned on said central guideway.

4. In a loading machine, a frame support, a central guideway on said support, cushioned rollers forming a loading platform in said guideway, a pair of conveyors having delivery ends terminating on opposite sides of said loading platform, said conveyor delivery ends being vertically spaced above said platform, and means including star wheels arranged between said platform and said conveyors for moving articles from said conveyors to loading position over said platform for gravity delivery into a container positioned on said cushioned loading platform.

5. In a loading machine, a central guideway for receiving a cellular container, a pair of endless conveyors supported in parallel spaced relation on opposite sides of said central guideway, said conveyors having delivery ends arranged in vertical spaced relation relative to said central guideway and terminating adjacent a loading station on said central guideway, and means arranged on opposite sides of said central guideway between said central guideway and each of said conveyors for successively moving pairs of articles from the conveyors to a loading position over the central guideway for gravity delivery into pairs of cells in a container on said central guideway.

6. In an article handling machine, a frame support, a central guideway on said support, said guideway including cushioned rollers forming a loading platform, a pair of conveyors having delivery ends terminating on opposite sides of said loading platform, said conveyor delivery ends being vertically spaced above said platform, and means including rotatable transfer elements arranged between said platform and said conveyors for moving articles from said conveyors to loading position over said platform for gravity delivery into a container positioned on said cushioned loading platform.

7. In a machine for loading articles into rows of cells in a container, a loading platform, a pair of conveyors having their delivery ends terminating adjacent said platform, said delivery ends being vertically spaced above said platform, means including side guide rails and rotatable pocketed transfer devices for moving articles successively from said conveyors to loading position over said platform for gravity delivery into a container on said platform, said means being synchronized to deliver the articles a pair at a time, and said means being arranged to deliver the articles in transversely spaced relation for loading into the outside rows of the container.

8. In a machine for loading articles into rows of cells in a container, a loading platform, a pair of conveyors having their delivery ends terminating adjacent said platform, said delivery ends being vertically spaced above said platform, means including curved side guide rails and a vertically mounted rotatable transfer wheels for successively moving articles in a lateral direction from said conveyors to loading position over said platform for free falling delivery into pairs of cells in oppositely spaced rows in a container on said platform, said means being arranged to deliver pairs of the articles in transversely spaced relation.

9. In a machine for loading articles in a container having a plurality of rows of cells therein to receive the articles, a central loading platform for said container, conveyors having their delivery ends terminating adjacent opposite sides of said platform, means for moving articles from said conveyors to loading position above said platform, and said means being arranged to successively deliver pairs of articles on each side of said platform for gravity delivery into spaced rows of cells in a container on said platform.

10. In a machine for loading bottles into containers having four longitudinal rows of aligned bottle cells, a platform over which the containers are adapted to advance in a longitudinal direction, parallel bottle conveyors arranged at opposite sides of said platform to deliver two rows of bottles along each side of said platform, means including star wheels for moving bottles in successive pairs from the inner rows on said conveyors to a position above said platform for loading into the outer rows of cells in said containers, and means including star wheels for moving bottles in successive pairs from the outer rows on said conveyors to a position above said platform for loading into the inner rows of cells in said containers.

11. In a machine for loading bottles into containers having four longitudinal rows of aligned bottle cells, a platform over which the containers are adapted to advance in a longitudinal direction, bottle conveyors arranged to deliver two lines of bottles adjacent each side of said platform, transfer means arranged between said platform and said conveyors for moving successive pairs of bottles from opposed lines on said conveyors into a position over said platform for gravity delivery into the outer rows of bottle cells in the containers, and transfer means arranged between said platform and said conveyors for moving successive pairs of bottles from the other lines on said conveyors into a position over said platform for gravity delivery into the inner rows of bottle cells in the containers.

12. In a machine for loading bottles into containers having four longitudinal rows of aligned bottle cells, a platform over which the containers are adapted to advance in a longiutdinal direction, pairs of bottle containers having their delivery ends arranged on opposite sides of said platform, and star wheels arranged between said platform and said conveyor ends to move successive bottles into position for gravity delivery into the cells in said containers, the star wheels and conveyors being so arranged that pairs of bottles are simultaneously delivered into transversely aligned cells in the outer and inner rows, respectively.

13. In a bottle loading machine, a guideway for receiving cellular containers, a conveyor for delivering a line of bottles to a point adjacent the guideway, a star wheel for moving the bottles one by one laterally from the conveyor to loading position over the guideway where they are free to drop by gravity into successive cells in a container positioned on the guideway.

14. A bottle loading mechanism comprising a base, a carton supporting platform positioned on said base, a bottle conveyor positioned on said base and having its upper run along the side of and above said platform, a star wheel positioned between said conveyor and said platform to move successive bottles from the upper run of the conveyor, and guide means cooperating with said star wheel for directing the bottles laterally as they are moved from the conveyor to a delivery position over said platform where they are free to drop into a container positioned thereon.

EDWIN L. ARNESON.

REFERENCES CITED

The following references are of record in the file of this patent:

UNITED STATES PATENTS

| Number | Name | Date |
| --- | --- | --- |
| Re. 21,288 | Novotny | Dec. 5, 1939 |
| 1,236,389 | Augensen | Aug. 14, 1917 |
| 1,243,406 | Hawthorne | Oct. 19, 1917 |
| 1,611,822 | Dulche | Dec. 21, 1926 |
| 2,013,555 | Deeren | Sept. 3, 1935 |
| 2,036,421 | Luckie | Apr. 7, 1936 |
| 2,219,827 | Kimball et al. | Oct. 29, 1940 |